(12) United States Patent
Moshi (10) Patent No.: US 6,865,868 B2
(45) Date of Patent: Mar. 15, 2005

(54) LAWN MOWER POWERED APPARATUS (76) Inventor: Akram A. Moshi, 68 Twigg Drive, Ajax, Ontario (CA), L1Z 1G5

( * ) Notice: Subject to any disclaimer, the term of this patent is extended or adjusted under 35 U.S.C. 154(b) by 0 days.

(21) Appl. No.: 10/617,111

(22) Filed: Jul. 11, 2003

(65) Prior Publication Data
US 2004/0016151 A1 Jan. 29, 2004

Related U.S. Application Data (63) Continuation-in-part of application No. 10/165,314, filed on Jun. 10, 2002, now abandoned.

(51) Int. Cl.[7] .............................................. A01D 34/00
(52) U.S. Cl. ........................................................... 56/2
(58) Field of Search ........................ 37/241–243; 56/2, 56/16.7, 16.8, 16.9; 290/1 A, 1 R, 1 B, 2; 322/1

(56) References Cited

U.S. PATENT DOCUMENTS

| | | |
|---|---|---|
| 2,871,585 A | 2/1959 | Merry et al. |
| 2,930,068 A | 3/1960 | Evanson et al. |
| 3,151,563 A | 10/1964 | Lita et al. |
| 3,286,376 A | 11/1966 | Wildes |
| 3,319,363 A | 5/1967 | Kennedy |
| 3,402,668 A | 9/1968 | Pusztay |
| 3,813,190 A | 5/1974 | Keating |
| 3,946,543 A | 3/1976 | Templeton |
| 4,308,676 A | 1/1982 | Doane |
| 4,446,679 A * | 5/1984 | Thomas ........................... 56/2 |
| 4,597,203 A * | 7/1986 | Middleton .................... 37/241 |
| 5,408,815 A | 4/1995 | Forte |
| 6,359,344 B1 | 3/2002 | Klein et al. |

* cited by examiner

Primary Examiner—Robert E Pezzuto
(74) Attorney, Agent, or Firm—Bereskin & Parr (57) ABSTRACT

A lawn mower powered apparatus has a base rollable over a surface, and the base has a top surface for receiving a lawn mower. The apparatus is provided with a rotating shaft operably connected to the base, and a blade coupler coupled to the rotating shaft. The blade coupler has a plurality of upstanding drive pins, each drive pin being independently movable between a raised position and a lowered position. Drive pins in the raised position project above the top surface of the base to engage the leading edge of the blade of a rotating lawn mower.

27 Claims, 9 Drawing Sheets

LAWN MOWER POWERED APPARATUS

RELATED APPLICATIONS

The following is a Continuation-In-Part application to U.S. patent application Ser. No. 10/165,314, filed Jun. 10, 2002 now abandoned.

FIELD OF THE INVENTION

The present invention relates to an apparatus that can be powered by a lawn mower, such as, for example, a snowblower apparatus.

BACKGROUND OF THE INVENTION

Homeowners often have powered implements, such as, for example, snowblowers for snow removal. At the same time, many homeowners have powered lawn mowers which sit idle during the winter months.

Attachments for combining a snowblower to a powered lawn mower are shown in U.S. Pat. No. 4,104,812 (Stribiak) and U.S. Pat. No. 4,403,433 (Smith). However, to use either apparatus disclosed in these references, the blade of the lawn mower must be removed from its shaft.

In U.S. Pat. No. 4,446,679 (Thomas) a multi-purpose implement for attachment to a lawn mower is disclosed. In one embodiment, the implement comprises a snowblower apparatus. To use the apparatus disclosed in Thomas, however, the blade of the lawn mower is also removed.

U.S. Pat. No. 2,930,068 (Evanson et al.) discloses a vacuum device powered by a lawn mower in which the device has a transverse bar with upstanding pins to engage the blade of a lawn mower. The blade of the lawn mower remains attached to the mower, but prior to positioning the mower over the device, the blade of the mower must be oriented to a proper rotational position relative to the transverse bar, so that the blade is disposed between the pins of the transverse bar.

U.S. Pat. No. 6,359,344 (Klein et al.) discloses an electric generating implement powered by a lawn mower, in which a coupling having a U-shaped slot engages the blade of a lawn mower from below. The coupling is biased upwardly by a spring, so that if the blade is not oriented with the slot upon positioning the mower over the generator, the coupling is pushed down to provide clearance. Upon starting the mower, Klein et al. teach that the initial rotation of the blade will result in alignment of the blade with the slot in the coupling, so that the force of the spring will push the coupling up into the desired engagement position. However, owing to the relatively high rotational speed of the lawnmower blade, even at start-up, it can be that the contact of the rotating blade with the upper surface of the coupling is sufficient to keep the coupling in the depressed, lowered position, so that the desired transfer of power from the blade to the coupling does not occur.

SUMMARY OF THE INVENTION

The present invention provides a lawn mower powered apparatus.

In a first aspect of the invention, a lawn mower powered apparatus is provided in which the apparatus has a base rollable over a surface, and the base has a top surface for receiving a lawn mower.

The apparatus is provided with a rotating shaft operably connected to the base, and a blade coupler coupled to the rotating shaft. The blade coupler has a plurality of upstanding drive pins, each drive pin being independently movable between a raised position and a lowered position. Drive pins in the raised position project above the top surface of the base to engage the leading edge of the blade of a lawn mower.

The blade coupler may have biasing means adjacent each drive pin to urge the drive pins to the raised position. The blade coupler may have an upper disc and a lower disc, with the upper disc having apertures through which the drive pins extend. The biasing means can be in the form of a compression spring provided between one drive pin and the lower disc. For a disclosed embodiment, eight drive pins are arranged in a circular array.

The apparatus may have an alignment coupling coupled to the rotating shaft to accommodate misalignment between the axis of rotation of the lawn mower blade and the axis of rotation of the blade coupler.

The apparatus may be provided with clamps to fix the position of a lawn mower on the top surface of the base with the blade over the blade coupler. The top surface of the base may have impressions therein for receiving corresponding wheels of a lawn mower to position the lawn mower on the top surface with the blade over the blade coupler.

The apparatus may be provided with a ramp adapted to be abutted to the base and configured to extend from the base to a surface that the base rests on, the ramp to allow a lawn mower to be rolled onto the top surface of the base.

The apparatus may have a first gear secured to the blade coupler and a second gear linked to the rotational shaft, so that the first gear transfers rotational motion of the blade coupler to the second gear to impart rotational motion to the rotating shaft.

In a second aspect of the invention, a lawn mower powered apparatus is provided in which the apparatus has a base rollable over a surface, and the base has a top surface for receiving a lawn mower. The apparatus has an implement section operably connected to the base, and the implement section is driven by an input shaft. The apparatus further has a blade coupler rotatably coupled to the base, the blade coupler having a plurality of upstanding drive pins. Each drive pin is independently movable between a raise position and a lowered position, and drive pins in the raised position project above the top surface of the base to engage the blade of a lawn mower from below. The apparatus further has a transmission to couple the blade coupler to the input shaft.

The implement section may be a snowblower, a roto-tiller, a generator, or a leaf blower.

In a third aspect of the invention, a lawn mower powered apparatus is provided in which the apparatus has a base rollable over a surface, and the base has a top surface for receiving a lawn mower.

The apparatus is provided with impeller blades which are operably connected to the base for blowing snow. Furthermore, the apparatus is provided with a blade coupler which is rotatably coupled to the base and has a plurality of upstanding drive pins, each pin being movable between a raised position and a lowered position, so that pins in the raised position project above the top surface of the base to engage the blade of a lawn mower from below. A transmission is provided to couple the blade coupler to the impeller blades.

The blade coupler may have biasing means adjacent each drive pin to urge the drive pins to the raised position. The blade coupler may have an upper disc and a lower disc, and the upper disc may have apertures through which the drive pins extend. The biasing means be in the form of a plurality of springs, one spring being provided between each drive pin and the lower disc. The drive pins may be arranged in a circular array, and the total number of drive pins may be eight.

The transmission may have an alignment coupling to accommodate misalignment between the axis of rotation of the lawn mower blade and the axis of rotation of the blade coupler.

The apparatus may be provided with clamps to fix the position of a lawn mower on the top surface of the base with the blade over the blade coupler. The top surface of the base may have impressions therein for receiving corresponding wheels of a lawn mower to position the lawn mower on the top surface with the blade over the blade coupler.

The apparatus may be provided with a ramp adapted to be abutted to the base and configured to extend from the base to a surface that the base rests on, the ramp to allow a lawn mower to be rolled onto the top surface of the base.

The transmission of the apparatus may have a first gear secured to the blade coupler and a second gear linked to the impeller blades, wherein the first gear transfers rotational motion of the blade coupler to the second gear to impart rotational motion to the impeller blades.

BRIEF DESCRIPTION OF THE DRAWINGS

In order that the invention may be more clearly understood, reference will be made to the accompanying drawings which illustrate a preferred embodiment of the present invention, and in which.

DETAILED DESCRIPTION OF THE INVENTION

Figure 1:
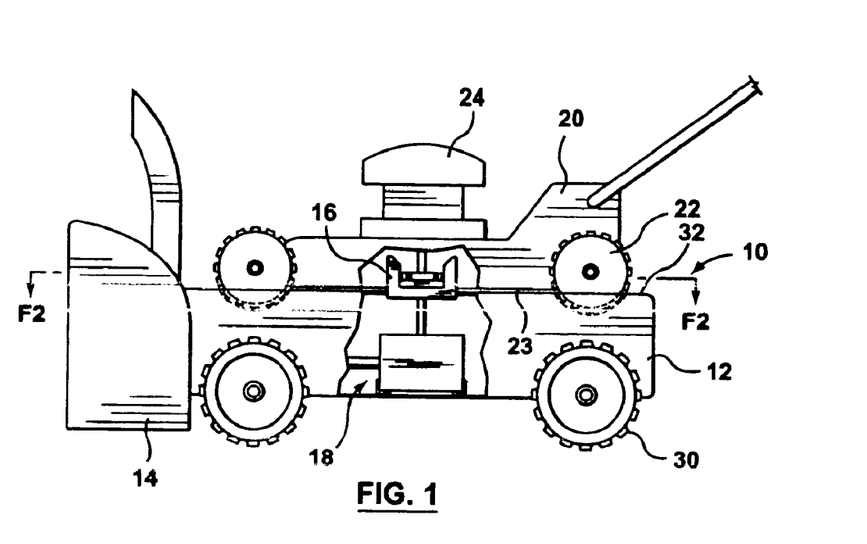
FIG. 1 is a left side view of an apparatus made in accordance with the present invention shown in combination with a lawn mower for powering the apparatus.
Figure 2:
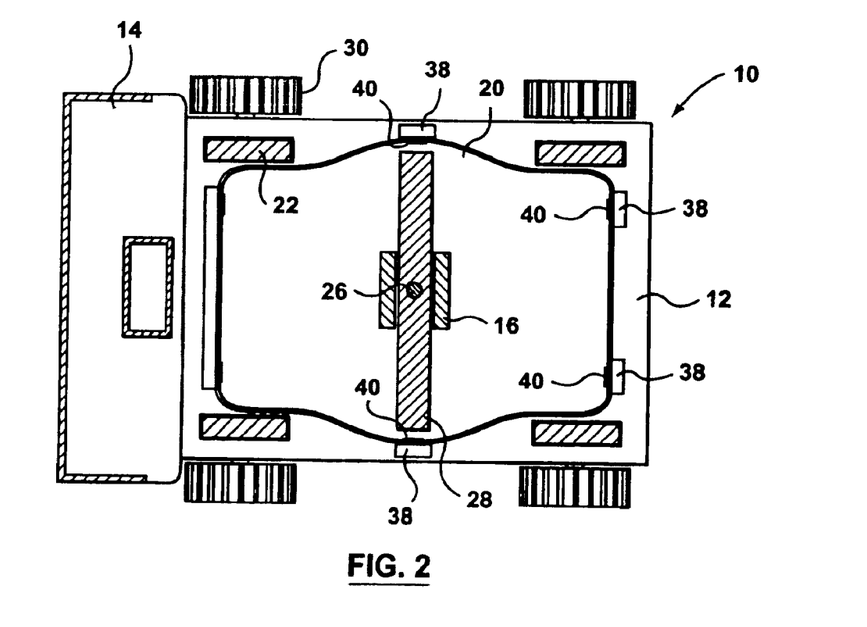
FIG. 2 is a cross-section of the apparatus and lawn mower shown in FIG. 1.

An apparatus made in accordance with the present invention is shown generally in the figures at 10. Referring to FIGS. 1 and 2, apparatus 10 is shown combined with a lawn mower 20 for powering apparatus 10. In the embodiment illustrated, apparatus 10 is in the form of the snowblower that can be maneuvered over a surface to clear away snow.

Apparatus 10 comprises base 12, implement section 14, blade coupler 16, and transmission 18. For the embodiment illustrated, the implement section 14 of apparatus 10 is a snowblower section. It is to be understood, however, that this is for purposes of illustration showing one preferred use of the invention. Other uses can include, for example, but not limited to, roto-tillers, leaf blowers, and generators.

Base 12 is rollable over a surface, and, for the embodiment illustrated, is provided with wheels 30 that can be sized to facilitate maneuvering the apparatus over snow covered surfaces. Base 12 has a top surface 32, adapted to receive lawn mower 20.

Figure 3:
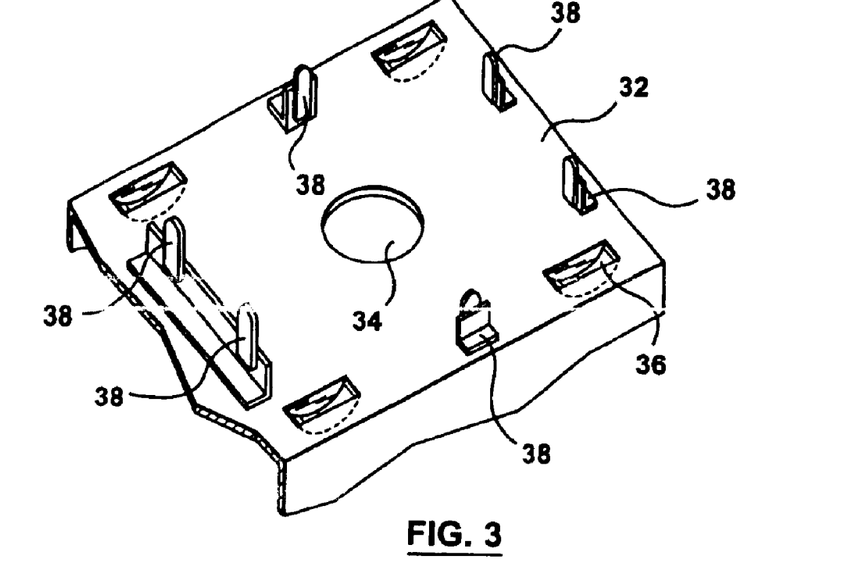
FIG. 3 is a perspective view of the base portion of the apparatus of FIG. 1.

Referring to FIG. 3, top surface 32 of base 12 has an opening 34 through which blade coupler 16 can protrude. Top surface 32 is further provided with impressions 36 which are sized and spaced apart to accommodate wheels 22 of lawn mower 20. Impressions 36 are positioned so that when engaged by wheels 22 of lawn mower 20, lawn mower blade 28 is aligned over blade coupler 16. Furthermore, as best seen in FIG. 1, impressions 36 have a depth so that the lower edge 23 of the deck of lawn mower 20 is positioned only slightly abode top surface 32 when wheels 22 of lawn mower 20 have engage impressions 36. This serves to enclose rotating blade 28 in a protective enclosure.

Referring to FIGS. 2 and 3, top surface 32 of base 12 is further provided with clamps 38 which are arranged around the perimeter of base 12. Clamps 38 cooperate with corresponding clamp engagement surfaces 40 of lawn mower 20, and serve to fix lawn mower 20 in position so that lawn mower blade 28 is aligned coaxially with blade coupler 16. Alternatively, clamps 38 may be provided around the perimeter of lawn mower 20, so as to cooperate with corresponding clamp engagement surfaces 40 provided around the perimeter of base 12 of apparatus 10. Clamps 38 may comprise, for example, but not limited to, a hasp, a c-clamp, or any other clamping means as is known in the art, and corresponding clamp engagement surfaces may comprise, for example, but not limited to, hooks, eyes, or slots or any other surface cooperating with clamps 38.

Figure 4:
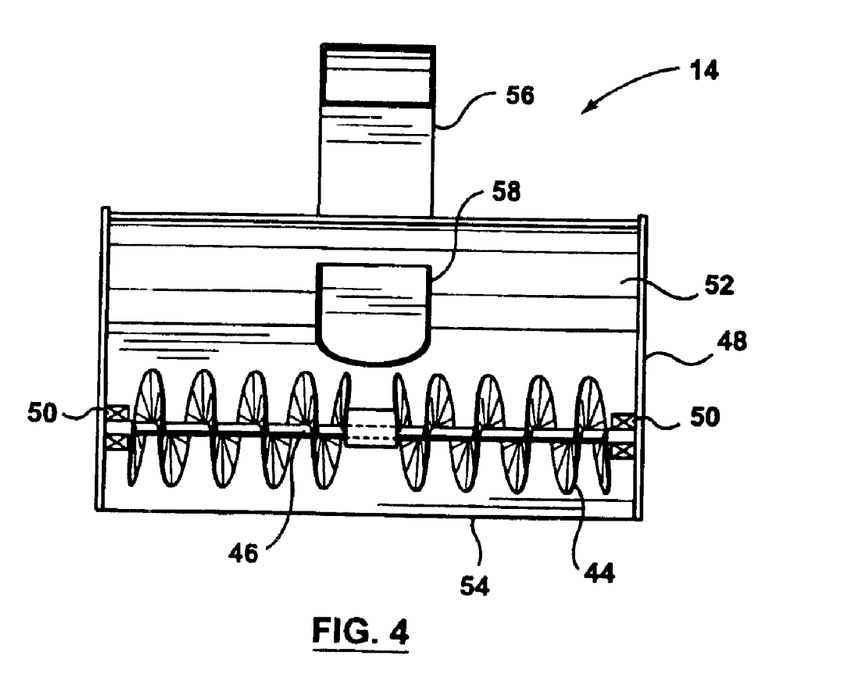
FIG. 4 is a front view of the implement portion of the apparatus of FIG. 1.

Referring now to FIG. 4, snowblower section 14 has impeller blades 44 fixed to shaft 46 and disposed within enclosure 48. Enclosure 48 is of sturdy construction, and has sufficient strength to support bearings 50 disposed at either end of shaft 46. The enclosure can be made of, for example, but not limited to, metal or a suitable plastic. The front 52 and bottom 54 sides of enclosure 48 are open so that impeller blades 44 may engage the snow to be removed by the snowblower. A chute 56 extends from opening 58 in enclosure 48 for the purpose of discharging the snow collected by impeller blades 44.

Figure 5:
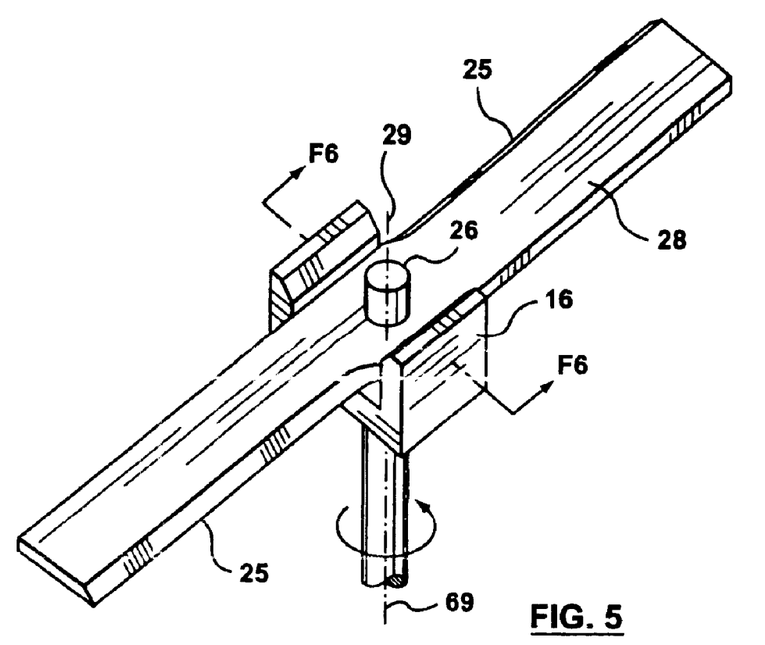
FIG. 5 is a perspective view of a coupling portion of the apparatus of FIG. 1 engaging the blade of a lawn mower.
Figure 6:
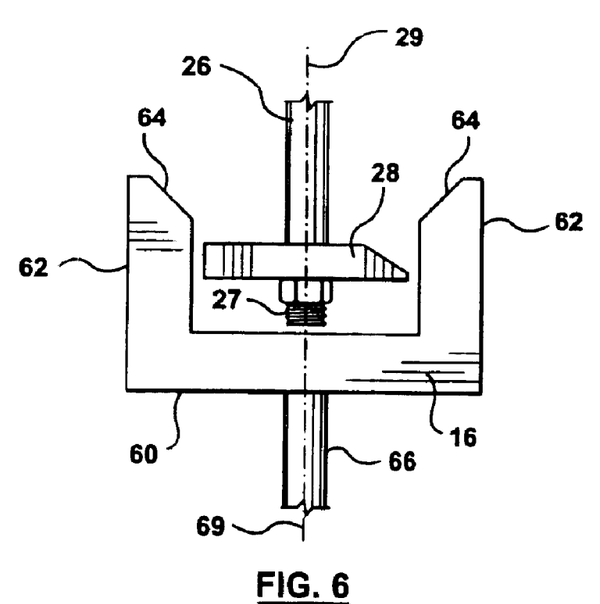
FIG. 6 is a cross-sectional view taken along the lines 6—6 of FIG. 5.

Referring now to FIGS. 5 and 6, blade coupler 16 is substantially U-shaped having a base portion 60 disposed between two upright flange portions 62. Upright portions 62 are spaced to accommodate the width of lawn mower blade 28, and extend upwardly a sufficient distance from base portion 60 to engage blade 28 while providing clearance for suitable blade mounting hardware 27 which may extend beneath blade 28. Each upright portion 62 extends lengthwise along the midsection of blade 28 so as to engage the width of blade 28 on either side of its axis of rotation 29, while preferably minimizing any engagement along cutting edges 25 of blade 28.

At the ends of upright portions 62 furthest from base portion 60, inwardly facing chamfers 64 can be provided. Chamfers 64 can facilitate the engagement of blade 28 into blade coupler 16, as will be discussed subsequently.

Extending from substantially the midpoint of base portion 60, and opposite to upright portions 62, is shaft 66. Blade coupler 16, under the influence of the rotation of shaft 26 and blade 28, rotates about the axis 69 of shaft 66.

Blade coupler 16 is preferably made of a tough material such as, for example, tool steel, so that it can withstand the high forces associated with transferring rotational power from blade 28 to shaft 66.

Figure 7:
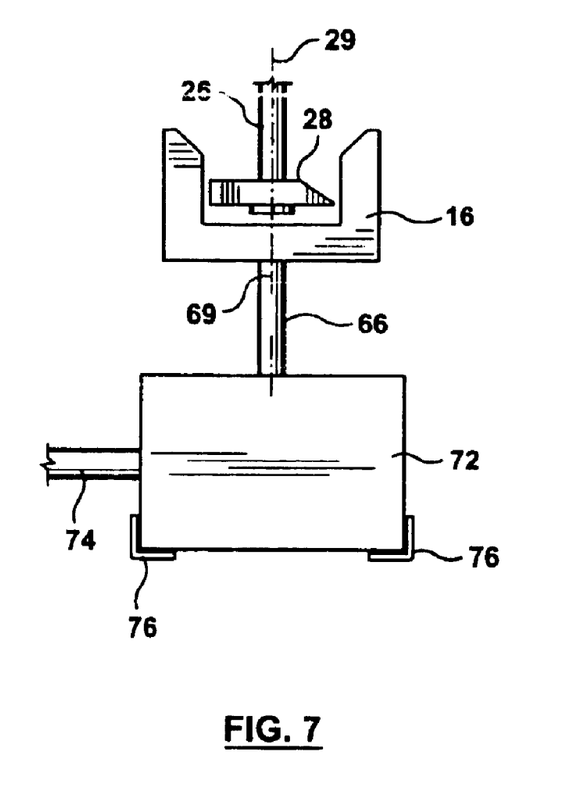
FIG. 7 shows the coupling portion of FIG. 6 attached to a portion of the transmission of the apparatus of FIG. 1.
Figure 8:
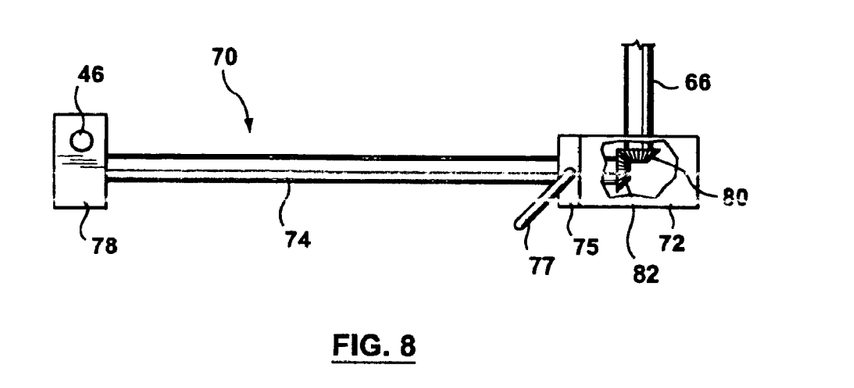
FIG. 8 is a side view of the transmission of the apparatus of FIG. 1.
Figure 9:
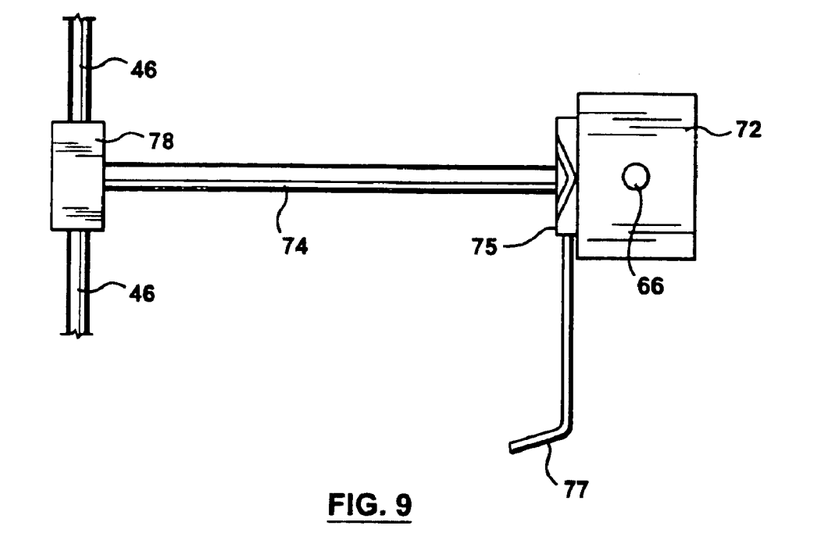
FIG. 9 is a top view of the transmission shown in FIG. 8.

Referring now to FIGS. 7, 8, and 9, transmission 70 comprises a first right angle gear box 72, disposed between blade coupler shaft 66 and intermediate transmission shaft 74. First gear box 72 can be supported by trusses 76 fixed within base 12. First gear box 72 and shaft 66 are positioned to dispose blade coupler 16 at a height relative to top surface 32 which operatively engages lawn mower blade 28.

As best seen in FIG. 8, first gear box 72 can house gears 80 and 82 which are fixed to shafts 66 and 74, respectively. Gears 80 and 82 cooperate to transfer rotation of shaft 66 to rotation of shaft 74. First gear box 72 may be a reduction type gear box as is known in the art, so that shafts 66 and 74 may have different rotational speeds. First gear box 72 may also be equipped with a clutch 75 operably connected to a lever 77 extending from base 12.

Referring again to FIGS. 8 and 9, intermediate transmission shaft 74 extends between first right angle gear box 72 and second right angle gear box 78, which transfers rotation of shaft 74 to rotation of impeller blade shaft 46 of snowblower section 14. Second gear box 78 may also be a reducing type gear box. It is preferable that second gear box 78 have physical dimensions which will not interfere with the collection and discharge of snow, particularly if, as illustrated in this embodiment, it is located within snowblower section 14.

Figure 10:
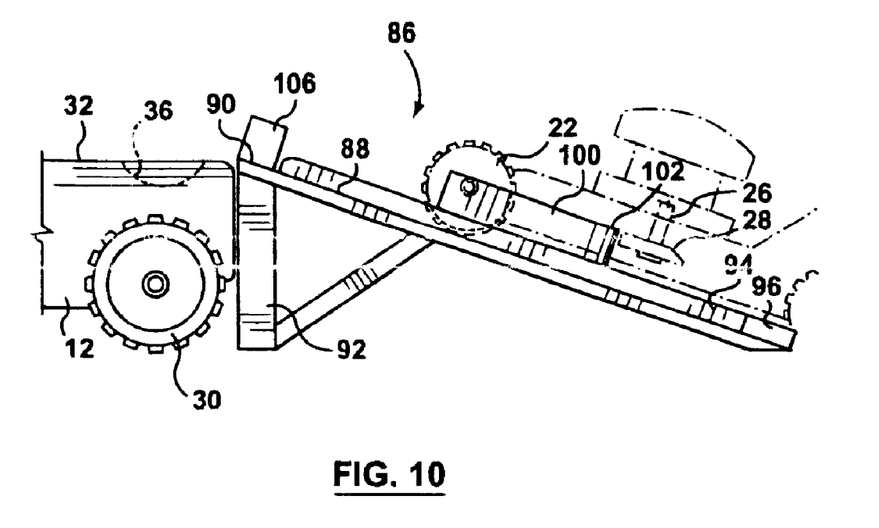
FIG. 10 is a side view of a ramp used in association with the apparatus of FIG. 1.
Figure 11:
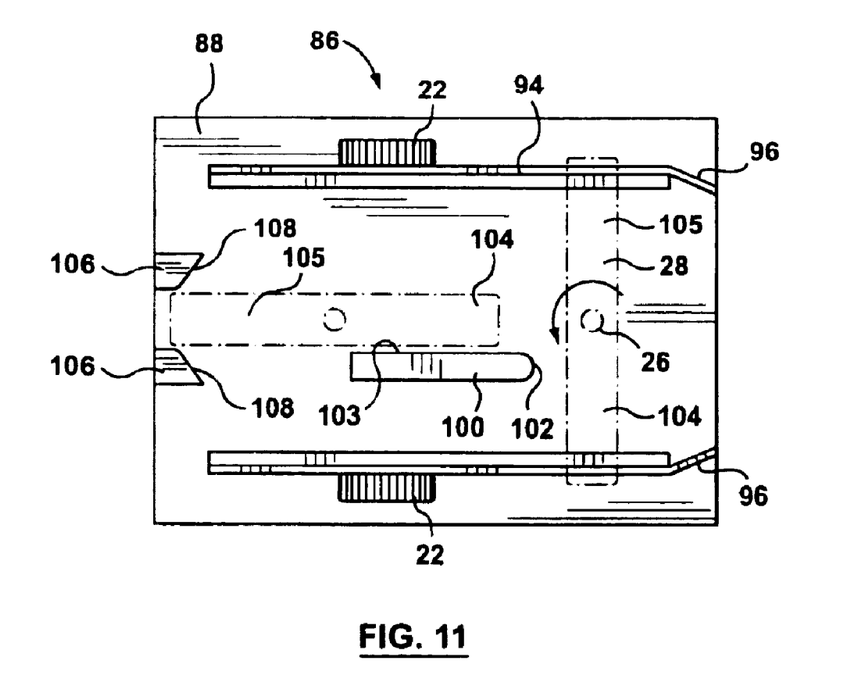
FIG. 11 is a top view of the ramp of FIG. 10.

Referring now to FIGS. 10 and 11, ramp 86 is provided for rolling lawn mower 20 on to top surface 32 of base 12. Ramp 86 has an inclined top surface 88 supported at its upper end 90 by uprights 92, so that top surface 88 at upper end 90 is at the same elevation as top surface 32 of base 12, when apparatus 10 and ramp 86 are abutted together, as illustrated in FIG. 10.

Top surface 88 of ramp 86 is provided with a pair of rails 94 which extend along substantially the entire length of, and perpendicular to, top surface 88. The height to which rails 94 extend from top surface 88 is sufficiently low so that rails 94 are cleared by blades 28 as lawn mower 20 is pushed along ramp 86. Rails 94 are spaced apart so that they have a gauge which is only slightly narrower than the transverse distance between wheels 22 of lawn mower 20. Th leading ends 96 of rails 94 are tapered inwardly to facilitate the desired straddling of rails 94 by lawn mower 20 as lawn mower 20 is pushed up and along ramp 86.

Top surface 88 of ramp 86 can further be provided with elongate block 100 which extends far enough from top surface 88 to catch blade 28 as lawn mower 20 is pushed along ramp 86. Elongate block 100 is positioned relative to rails 94 so that it is offset to one side of lawn mower shaft 26 when wheels 22 have straddled rails 94. As lawn mower 20 is pushed along ramp 86, leading edge 102 of block 100 catches one end 104 of blade 28 until blade 28 is oriented substantially parallel to the direction of travel along ramp 86.

Elongate block 100 has an elongate body 103 extending along the direction of travel along ramp 86 sufficient to prevent over-rotation of blade 28 as lawn mower 20 is pushed along ramp 86. Particularly if pushed with some speed, the force on end 104 of blade 28 upon contacting leading edge 102 of block 100 may be sufficient to rotate blade 28 past the properly oriented position. This over-rotation can be stopped by end 105 of blade 28 contacting elongate body 103 of block 100, thereby ensuring satisfactory orientation of blade 28.

A pair of gate posts 106 can be provided at the upper end of ramp 86. Gate posts 106 extend from top surface 88 to a height sufficient to catch blades 28 of passing lawn mower 20, and are spaced apart to allow only a properly oriented blade 28 to pass through. Gates posts 106 can have inwardly tapered leading edges to correct any slight mis-orientation of blade 28 prior to passing through. Gate posts 106 and elongate block 100 can be constructed of a hard material which will not damage blade 28, such as, for example, nylon or plastic.

To assemble apparatus 10 to lawn mower 20, ramp 86 is abutted against apparatus 10 so that upper end 90 is adjacent the rear of base 12. Blade coupler 16 must then be oriented manually so that uprights 62 are aligned parallel with the direction of travel along base 12. This can be facilitated by disengaging clutch 75 using lever 77 (see FIGS. 8 and 9), so that blade coupler 16 is no longer engaged to shaft 74 and impeller blades 44. Lawn mower 20 is then pushed up and along ramp 86, and onto top surface 32 of base 12.

As the front set of lawn mower wheels 22 leaves to surface 88 of ramp 86, lawn mower 20 can be pivoted slightly on its rear set of wheels so that the front set of wheels passes over the rear set of impressions 36 provided in top surface 32 of base 12. Once both sets of lawn mower wheels 22 have left ramp 86, lawn mower 20 is pushed forward along top surface 32 of base 12 until wheels 22 engage corresponding impressions 36. As wheels 22 engage impressions 36, lawn mower 20 drops relative to base 12, causing blade 28 to descend between uprights 62 of blade coupler 16.

A certain degree of mis-orientation between blade 28 and blade coupler 16 can be accommodated by chamfers 64 of uprights 62, in that blade 28 may contact chamfers 64 while descending between uprights 62, causing blade 28 and blade coupling 16 to rotate relative to each other to a properly oriented position.

Once lawn mower 20 has been pushed into position on top surface 32 of base 12, clamps 38 may be fastened, and power source 24 of lawn mower 20 may be started. Rotation of lawn mower blade 28 is transferred to rotation of impeller blades 44 through impeller shaft 46 of snowblower section 14. Using the handle of lawn mower 20, apparatus 10 can be maneuvered to clear snow from driveways, sidewalks, or other surfaces as may be required.

Referring again to FIG. 7, it is to be appreciated by one skilled in the art that for smooth transfer of rotational motion from lawn mower blade 28 to blade coupler 16, it is desirable that the axis of rotation 29 of blade 28 be aligned as closely as possible to be coaxial with the axis of rotation 69 of blade coupler 16. Any misalignment between axes 29 and 69 may cause undesirable vibration of, and possibly damage to, any of the many moving parts of apparatus 10 and lawn mower 20.

Figure 12:
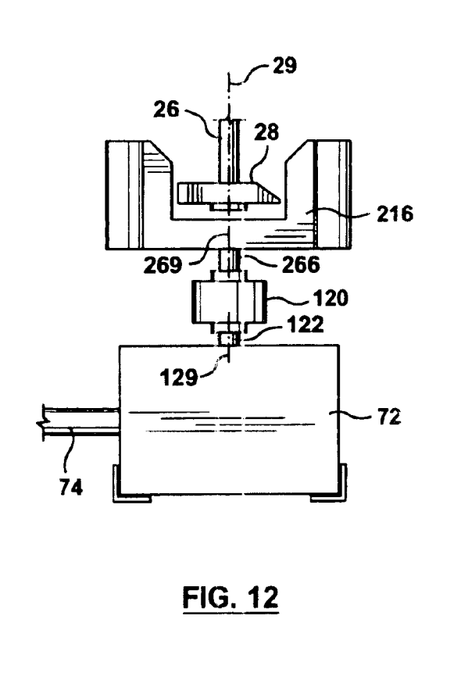
FIG. 12 is an alternate embodiment of the blade coupler portion of the apparatus of FIG. 1.

Referring now to FIG. 12, an alternate embodiment of the invention is provided. A modified blade coupler 216 is provided wherein continuous shaft 66 of blade coupler 16 is replaced with alignment coupling 120 disposed between upper shaft segment 266 extending from modified blade coupler 216 and lower shaft segment 122 extending from first gear box 72. Modified blade coupler 216 and lower shaft segment 122 have corresponding axes of rotation 269 and 129, respectively.

Alignment coupling 120 has the ability to compensate for both angular and radial misalignment of rotating shafts 266 and 122 between which it is disposed. Such couplings, combining the properties of universal joints and Oldham couplers, are well known in the art.

In operation, alignment coupling 120 allows modified blade coupler 216 to rotate about axis 269, in substantially coaxial alignment with axis 29 about which lawn mower blade 28 rotates. Misalignment between axes 269 and 129 is accommodated by alignment coupling 120, thereby providing smooth transfer of rotational motion from blade 28 to shaft 122.

Figure 13:
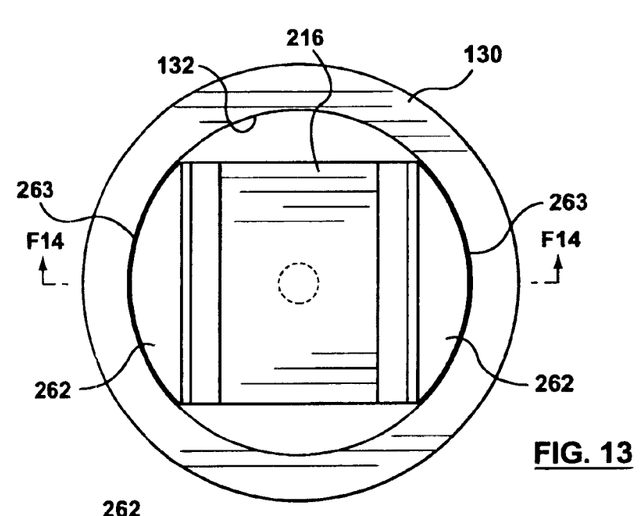
FIG. 13 is a top view of the blade coupler of FIG. 12 shown in a bushing.
Figure 14:
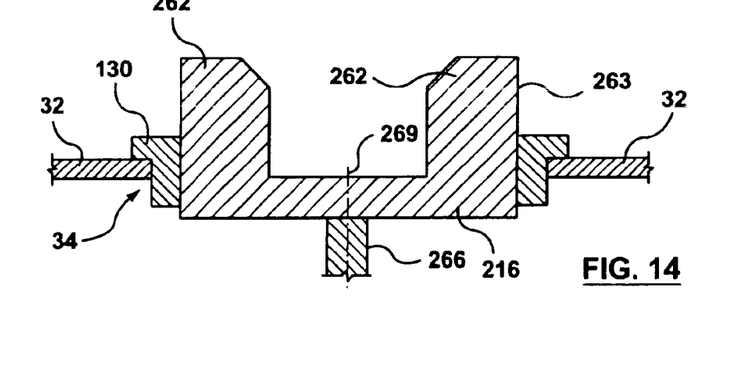
FIG. 14 is a cross-sectional view taken along the lines 14—14 of FIG. 13.

Referring now to FIGS. 13 and 14, modified blade coupler 216 further comprises uprights 262 having concave outer surfaces 263. Outer surfaces 263 comprise arcs of a circle having axis 269 as its origin.

Bushing 130 is provided for use with modified blade coupler 216. Bushing 130 is fixed in opening 34 of top surface 32 of base 12, and has an inner diameter surface 132 which accommodates concave outer surfaces 263 of uprights 262. In this way, bushing 130 supports rotating blade coupler 216, but provides some float so as to permit alignment coupling 120 to accommodate any misalignment, as discussed previously. Bushing 130 may be of the rotary, self-aligning type, as is known in the art.

Figure 15:
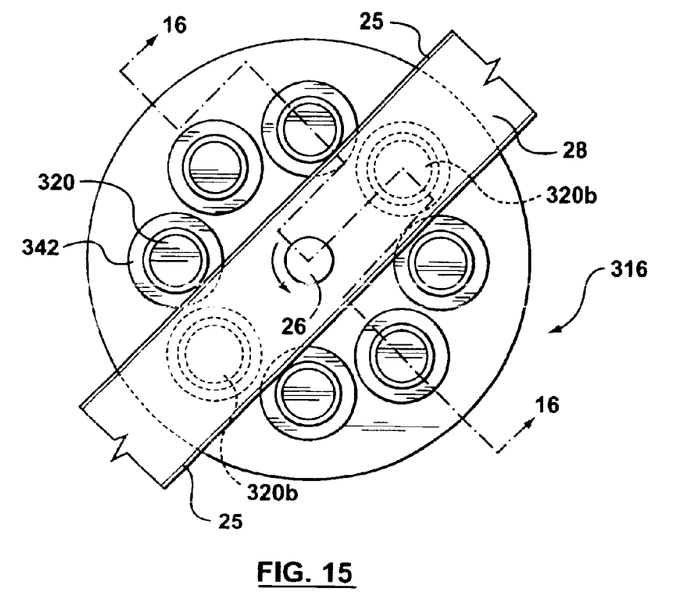
FIG. 15 is a top view of another alternate embodiment of the blade coupler portion of the apparatus of FIG. 1.
Figure 16:
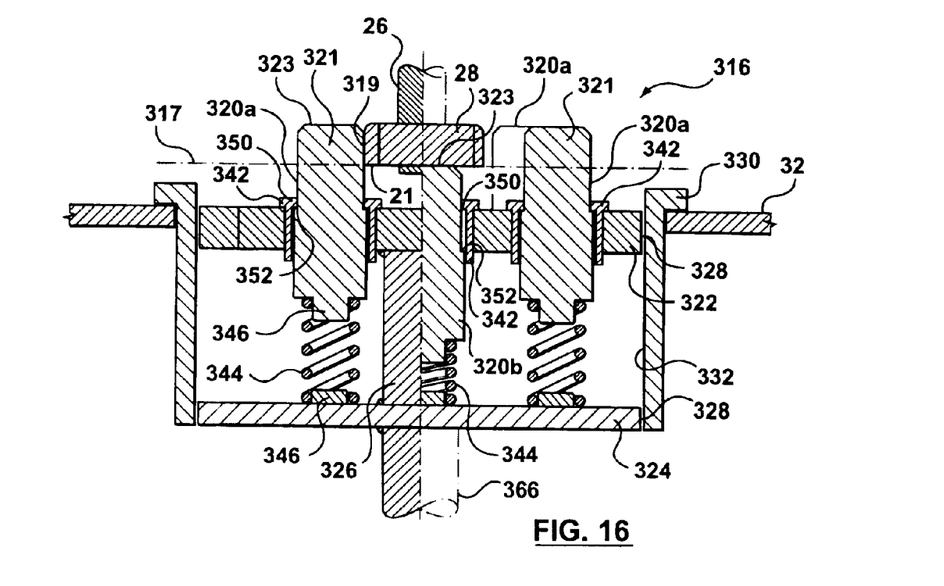
FIG. 16 is a cross-sectional view taken along the lines 16—16 of FIG. 15.

Referring now to FIGS. 15 and 16, in another alternate embodiment of the present invention, a modified blade coupler 316 is provided that does not require orientating the blade 28 of a lawn mower and the blade coupler 316, prior to coupling, as previously disclosed. For this embodiment, the blade coupler 316 can couple a blade 28 from below, regardless of the particular rotational position of the blade 28 when presented to the coupler 316, as will hereinafter be described.

To achieve this functionality, the blade coupler 316 is provided with a plurality of upstanding drive pins 320, each of which is independently movable between a raised and lowered position. When in the raised position, an upper portion 321 of the drive pins 320 extend upward a sufficient height to protrude above a horizontal plane 317 defined by the lower surface 21 of a rotating blade 28 of a lawn mower 20 positioned over the coupler 316. In other words, an upper portion 321 of the drive pins 320 is contacted and pushed laterally by the leading edge 25 of the rotating blade 28, so that rotation is imparted to the coupler 316. In this way, a raised drive pin 320 engages the blade 28 so that the coupler 316 is coupled to the blade 28. When in the lowered position, the upper portions 321 of the drive pins 320 are below the lower surface 21 of the blade 28. Therefore, a lowered pin 320 does not engage the blade 28.

In a preferred embodiment illustrated in FIGS. 15 and 16, the blade coupler 316 has an upper disc 322 and a parallel lower disc 324, both of which are fixed to a shaft 326. The shaft 326 has a lower portion 366 for attachment to an alignment coupling 12Q, similar to shaft 266 of blade coupler 216.

The upper and lower discs 322 and 324, respectively, have outer edge surfaces 328, which cooperate with the inner surface 332 of a bushing 330 to provide lateral support for the blade coupler 316. The bushing 330 is fixed in the opening 34 of the top surface 32 of the base 12 as shown in FIG. 3, similar to the bushing 130 described earlier (FIG. 14).

Referring again to FIGS. 15 and 16, the blade coupler 316 is provided with eight drive pins 320 which are arranged in a circular array. Each drive pin is slidibly retained in a pin bushing 342 which is pressed into a corresponding aperture in the upper disc 322.

Compression springs 344 are provided between the lower disc 324 and the drive pins 320 to bias the pins 320 in the raised position. Opposed stabilizing buttons 346 are provided on the bottom surface of the drive pins 320 and the top surface of the lower disc 324 to support the ends of the springs 344.

A retaining lip 350 is provided on the inner surface of the pin bushings 342 to engage a shoulder 352 provided on the outer surface of the drive pins 320, for limiting the upward travel of the drive pins 320 within the pin bushings 342.

In use, the lawn mower 20 is rolled over the top surface 12 until the wheels 22 engage the impressions 36 provided in the top surface 32 of the apparatus 10 (FIGS. 1 and 3). As previously described, once the wheels 22 engage the impressions 36, the shaft 26 of the lawn mower 20 will be generally centrally located over the blade coupler 316, and as well, the mower and the blade 28 will drop down towards the blade coupler 316.

Without having taken any steps to orient the blade 28 relative to the blade coupler 316, the blade 28 may be in any rotational position. In FIG. 15 a rotational position of about 45 degrees has been illustrated. As the blade 28 drops down towards the coupling 316, the blade 28 will engage the top surface 323 of at least two of the drive pins 320, thereby moving them from the raised position to the lowered position (see lowered drive pin 320b in FIG. 16). A number of drive pins 320a adjacent the lowered drive pins will remain in the raised position.

Accordingly, when the lawn mower 20 is started, the blade 28 will begin to rotate and the leading edge 25 of the blade 28 will necessarily engage the upper portion 321 of a drive pin 320a in the raised position, thereby imparting rotational motion from the blade 28 to the blade coupler 316. The contact area between the leading edge 25 of the blade 28 and the upper portion 321 of a raised drive pin 320a is identified in FIG. 16 at reference character 319.

Figure 17:
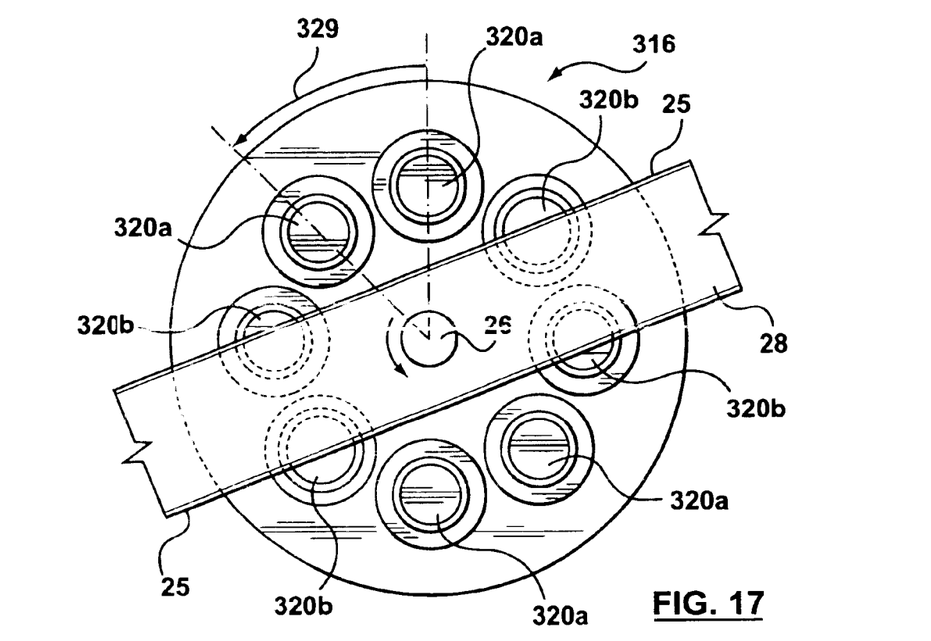
FIG. 17 is another view of FIG. 15 but showing the blade in a different angular position.

Of course it may be that the blade 28 is not so neatly aligned as illustrated in FIG. 15, wherein the blade contacts only two opposed drive pins 320 without overlapping adjacent drive pins 320. However, as best seen in FIG. 17, even if the blade 28 were to be aligned so as to overlap adjacent drive pins 320, the result would be that four, rather then only two, drive pins 320b would be moved from the raised position to the lowered position. There would still be another four drive pins 320a which would remain in the raised position. Accordingly, no matter what rotational position the blade 28 is in, at least one drive pin 320a remains in the raised position and will provide positive engagement with the blade 28 when the lawn mower 20 is started.

Figure 18:
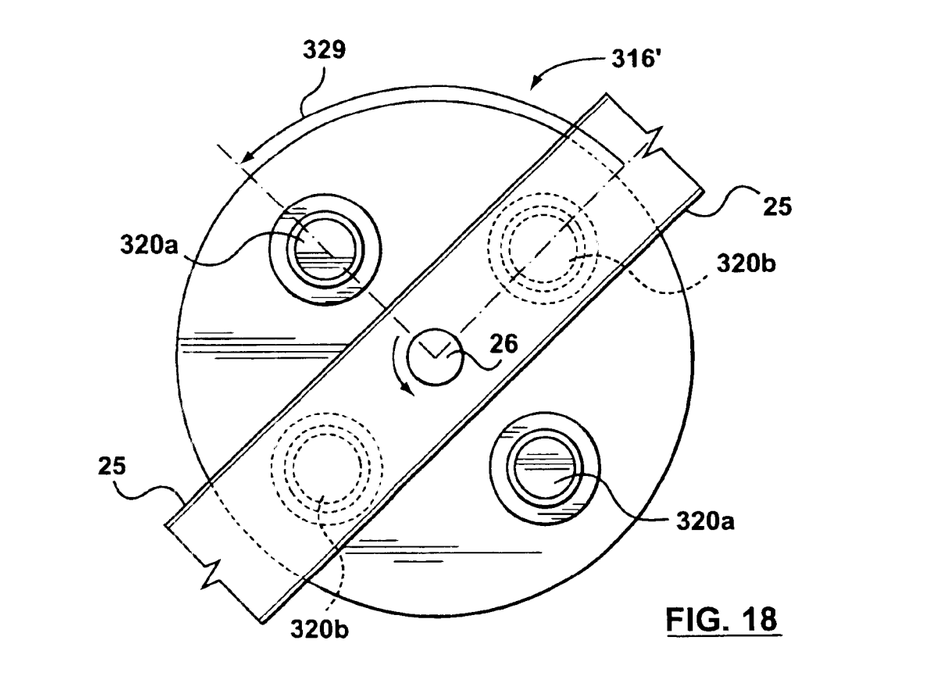
FIG. 18 is a top view of another alternate embodiment of the blade coupler portion of the apparatus of FIG. 1.

Rather than providing the eight drive pins 320 as configured in the illustrated embodiment, other configurations would of course also be possible. For example, as seen in FIG. 18, four drive pins 320 spaced at 90 degrees in a modified 316' could result in the blade 28 moving only one pair of opposed pins 320b from the raised to the lowered position. However, by having fewer drive pins 320, the rotational speed of the blade 28 before engaging a drive pin 320 would be significantly higher owing to the larger angular gap 329 between adjacent drive pins 320, as compared to the angular gap 329 of the coupler 316 as seen in FIG. 17. The higher rotational speed of blade 28 may result in the blade striking the drive pin 320, rather than pushing the drive pin 320, which may in turn cause damage to the pins 320 and/or the blade 28.

While preferred embodiments of the invention have been described herein in detail, it is to be understood that this description is by way of example only, and is not intended to be limiting. The full scope of the invention is to be determined from reference to the appended claims.

What is claimed is:

1. A lawn mower powered apparatus comprising:
   a. a base rollable over a surface, the base providing a top surface for receiving a lawn mower;
   b. a rotating shaft operably connected to the base; and
   c. a blade coupler coupled to the rotating shaft, the blade coupler having a plurality of upstanding drive pins, each drive pin being independently movable relative to adjacent drive pins between a raised position and a lowered position, wherein drive pins in the raised position project above the top surface of the base to engage a leading edge of a rotating blade of a lawn mower.

2. The apparatus according to claim 1 wherein the blade coupler comprises a plurality biasing means, each biasing means associated with a respective one of said plurality of drive pins to urge the drive pins to the raised position.

3. The apparatus according to claim 2 wherein the blade coupler comprises an upper disc and a lower disc, the upper disc having apertures through which the drive pins slidably extend.

4. The apparatus according to claim 3 wherein each biasing means comprises a compression spring provided between a respective drive pin and the lower disc.

5. The apparatus according to claim 4 wherein the drive pins of the blade coupler are arranged in a circular array.

6. The apparatus according to claim 5 wherein the blade coupler has eight drive pins.

7. The apparatus according to claim 1 further comprising an alignment coupling coupled to the shaft to accommodate misalignment between the axis of rotation of the lawn mower blade and the axis of rotation of the blade coupler.

8. The apparatus according to claim 1 further comprising clamps to fix the position of a lawn mower on the top surface of the base and with the blade over the blade coupler.

9. An apparatus according to claim 8 wherein the top surface of the base presents impressions therein for receiving corresponding wheels of a lawn mower to position the lawn mower on the top surface with the blade over the blade coupler.

10. An apparatus according to claim 1 further comprising a ramp adapted to be abutted to the base and configured to extend from the base to a surface that the base rests on the ramp to allow a lawn mower to be rolled onto the top surface of the base.

11. An apparatus according to claim 1 further comprising a first gear secured to the blade coupler and a second gear linked to the rotational shaft, wherein the first gear transfers rotational motion of the blade coupler to the second gear to impart rotational motion to the rotating shaft.

12. A lawn mower powered apparatus comprising:
   a. a base rollable over a surface, the base providing a top surface for receiving a lawn mower;
   b. an implement section operably connected to the base, the implement section being driven by an input shaft;
   c. a blade coupler rotatably coupled to the base, the blade coupler having a plurality of upstanding drive pins, each drive pin being independently movable relative to adjacent drive pins between a raised position and a lowered position, wherein drive pins in the raised position project above the top surface of the base to engage the blade of a lawn mower from below; and
   d. a transmission to couple the blade coupler to the input shaft.

13. An apparatus according to claim 10 wherein the implement section comprises a snowblower.

14. An apparatus according to claim 10 wherein the implement section comprises a roto-tiller.

15. An apparatus according to claim 10 wherein the implement section comprises a generator.

16. An apparatus according to claim 10 wherein the implement section comprises a leaf blower.

17. A lawn mower powered apparatus, comprising:
   a. a base rollable over a surface, the base providing a top surface for receiving a lawn mower;
   b. impeller blades operably connected to the base for blowing snow;
   c. a blade coupler rotatably coupled to the base, the blade coupler having a plurality of upstanding drive pins, each drive pin being independently movable relative to adjacent drive pins between a raised position and a lowered position, wherein drive pins in the raised position project above the top surface of the base to engage the blade of a lawn mower from below; and
   d. a transmission to couple the blade coupler to the impeller blades.

18. The apparatus according to claim 17 wherein the blade coupler comprises biasing means adjacent each drive pin to urge the drive pins to the raised position.

19. The apparatus according to claim 18 wherein the blade coupler comprises an upper disc and a lower disc, the upper disc having apertures through which the drive pins slidably extend.

20. The apparatus according to claim 19 wherein the biasing means comprises a plurality of springs, one spring being provided between each drive pin and the lower disc.

21. The apparatus according to claim 20 wherein the drive pins of the blade coupler are arranged in a circular array.

22. The apparatus according to claim 21 wherein the blade coupler has eight drive pins.

23. The apparatus according to claim 17 wherein the transmission comprises an alignment coupling to accommodate misalignment between the axis of rotation of the lawn mower blade and the axis of rotation of the blade coupler.

24. The apparatus according to claim 17 further comprising clamps to fix the position of a lawn mower on the top surface of the base and with the blade over the blade coupler.

25. An apparatus according to claim 24 wherein the top surface of the base presents impressions therein for receiving corresponding wheels of a lawn mower to position the lawn mower on the top surface with the blade over the blade coupler.

26. An apparatus according to claim 17 further comprising a ramp adapted to be abutted to the base and configured to extend from the base to a surface that the base rests on the ramp to allow a lawn mower to be rolled onto the top surface of the base.

27. An apparatus according to claim 17 further comprising a first gear secured to the blade coupler and a second gear linked to the rotational shaft, wherein the first gear transfers rotational motion of the blade coupler to the second gear to impart rotational motion to the rotating shaft.

* * * * *